April 17, 1962
L. GLABERSON
3,030,475
CONTROL DEVICE
Filed March 2, 1959
2 Sheets-Sheet 1
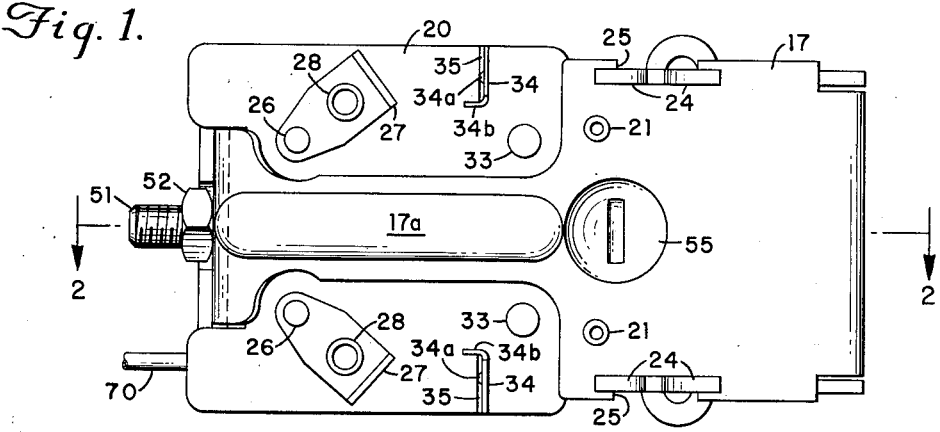
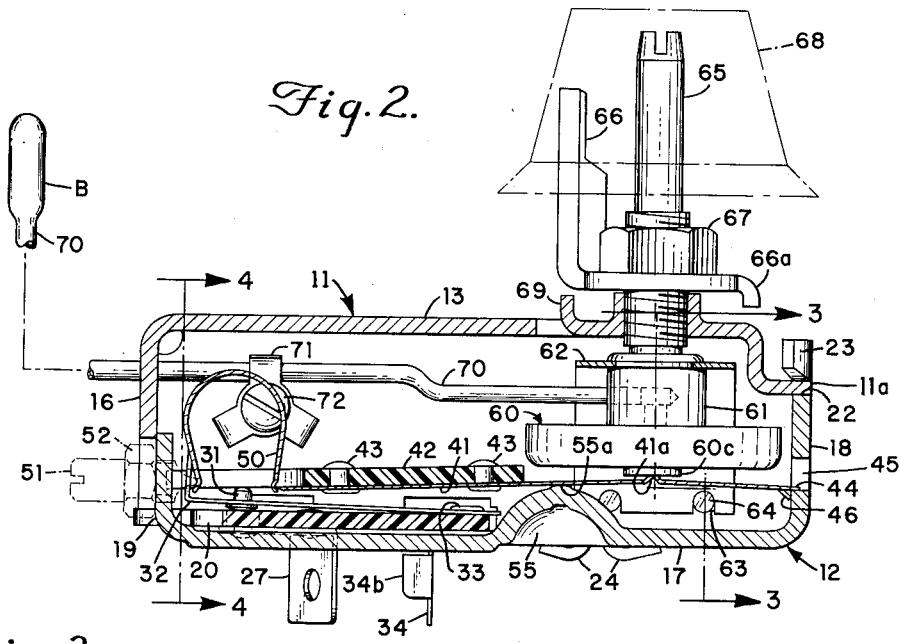
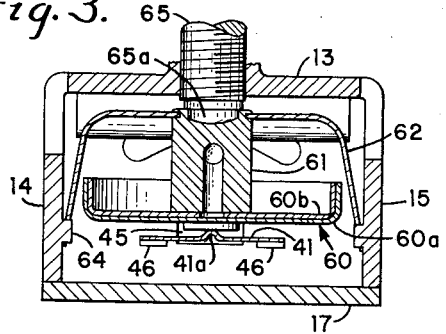
*INVENTOR.*
LOUIS GLABERSON
BY
*Andrew G. Hubbard*
ATTORNEY April 17, 1962 L. GLABERSON 3,030,475
CONTROL DEVICE
Filed March 2, 1959 2 Sheets-Sheet 2
Fig. 4.
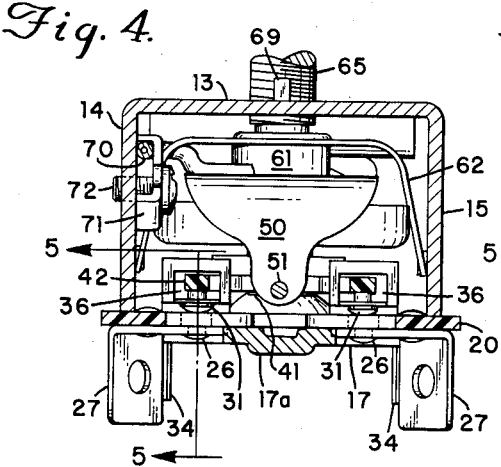
Fig. 4a.
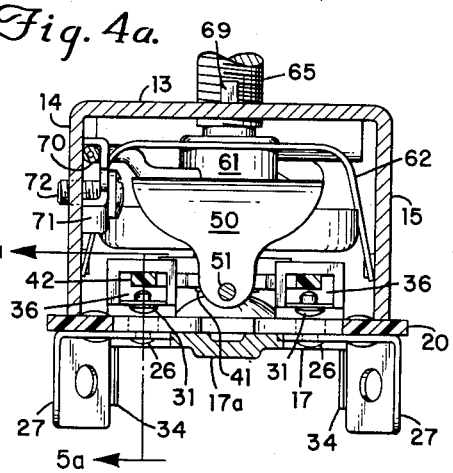
Fig. 5.
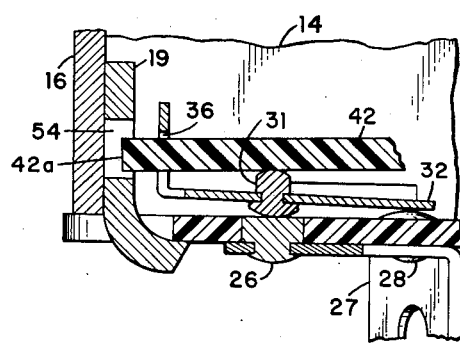
Fig. 5a.
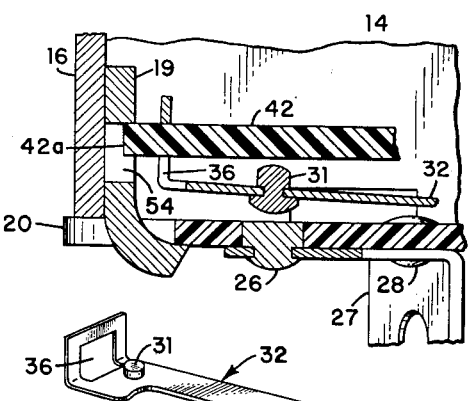
Fig. 6.
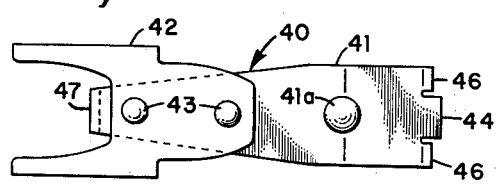
Fig. 7.
INVENTOR.
LOUIS GLABERSON
BY
Andrew B. Hubbard
ATTORNEY though one preferred practice is to form the upper portion 11 from 0.064" gauge steel and to form the lower portion 12 from 0.090" gauge steel.

United States Patent Office 3,030,475
Patented Apr. 17, 1962

3,030,475
CONTROL DEVICE
Louis Glaberson, Chicago, Ill., assignor to General Electric Company, a corporation of New York
Filed Mar. 2, 1959, Ser. No. 796,670
17 Claims. (Cl. 200—140)

This invention relates to a control device, and it is an object of the invention to provide a control device which is inexpensive and simple to manufacture, and in which the proper operation of the device is insured by the construction of the parts and the uniformity of the assembled relationship thereof, even when the assembly is performed by unskilled labor in a mass production operation.

The invention is particularly applicable to the opening and closing of electrical circuits in response to changes in the physical state of an external object, such as the temperature control of electric ovens and other heating or cooling apparatus, or the control of mechanism in response to the change of pressure in a system containing such mechanism. Various features of the invention are, however, adapted to other control device applications, and it is to be understood that the invention is not limited in its application to the control of electric circuits.

A control device constructed in accordance with the preferred embodiment of the invention, incorporating one or more electric switches, is exceptionally economical to manufacture and has the characteristic of maintaining electric switch contacts closed under constant pressure until they are drawn apart with a snap action. Similarly, the switch contacts move very rapidly to closed position and are thereafter held closed with a constant force. Accordingly, arcing between switch contacts is reduced to a minimum. At the same time, the various parts of the device are so arranged as to permit adjustment such that the device may respond to any selected control condition over a suitable range, and to permit adjustment of the amplitude of the device, i.e. the spread between switch opening and switch closing, both of these adjustments being stable by virtue of the specific arrangement of the various elements of the device.

Accordingly, it is another object of the invention to provide control device which minimizes the burning of switch contacts.

It is still another object of the invention to provide a control device which is adjustable as to its range and as to the external conditions to which it responds and which is characterized by great stability of these adjustments.

It is a further object of the invention to provide an improved control device having various of the characteristics referred to above while being exceptionally economical to manufacture.

Further features of the invention pertain to the particular form and arrangement of the individual elements of the control device, whereby the above outlined and additional features thereof are attained.

The invention, both as to its organization and method of operation, together with further objects and advantages thereof, will best be understood by reference to the following specification, taken in connection with the accompanying drawings.

In accordance with the preferred embodiment of the invention, a two part housing is provided for the control device, the two parts being readily brought together and secured to each other to form a complete housing. One housing portion carries an expansible element which is responsive to the change in physical state of an external body, along with adjusting means for such element. The other housing portion carries switch contacts and a switch actuating, snap action spring blade assembly, complete with amplitude adjusting means, whereby neither this critical adjustment nor the cooperation of the switch contacts and the switch actuator is affected by any slight misalignment of the two housing portions as assembled. The two housing portions seat firmly and accurately against each other and are readily maintained firmly in their proper assembled positions whereby the adjustment for desired operating response may be held stable within required limits, even through the expansible element and the switch actuating blade are mounted on different housing portions.

The switch contacts incorporated in the device are spring biased toward closed position and are not subject to any switch opening force until the switch actuating blade snaps to its alternative position and snatches the movable contacts to their fully opened position. Similarly, when the switch actuating blade is permitted to snap back to its initial or normal position, the movable contacts are free to return rapidly to their fully closed position.

The two housing portions are preferably formed from heavy gauge sheet metal by stamping operations whereby they are very economical to manufacture. The two housing portions as stamped have incorporated therein various accurately positioned support points for the working elements of the control device whereby the number of parts is minimized and the assembly of the control device is greatly simplified.

In the drawings in which like parts are designated by like numerals,
FIGURE 1 is a bottom plan view of a control device incorporating the invention;
FIGURE 2 is an elevational cross-sectional view of the same device taken in the direction of the arrows along the line 2—2 of FIGURE 1;
FIGURE 3 is a partial cross-sectional view taken in the direction of the arrows along the line 3—3 of FIGURE 2;
FIGURE 4 is a cross-sectional view taken in the direction of the arrows along the line 4—4 of FIGURE 2;
FIGURE 4a is a cross-sectional view similar to FIGURE 4 but showing the device in switch-open position;
FIGURE 5 is an enlarged, partial cross-sectional view taken in the direction of the arrows along the line 5—5 of FIGURE 4;
FIGURE 5a is an enlarged, partial cross-sectional view taken in the direction of the arrows along the line 5a—5a of FIGURE 4a;
FIGURE 6 is a plan view of a switch actuating blade assembly incorporated in the control device of FIGURES 1–5a; and,
FIGURE 7 is a perspective view of a movable switch contact assembly incorporated in the control device of FIGURES 1–5a.

The embodiment of the invention shown in the drawings is not intended to represent a specific form of device as respects temperature or pressure response, for the advantageous features of the invention are common to both types of control device.

The control device illustrated in the drawings includes a housing having an upper portion 11 and a lower portion 12. By reference to FIGURES 2 and 3, it may be seen that the upper portion 11 comprises the upper wall 13, the two side walls 14 and 15 and a portion 16 of the left end wall of the complete housing, and the lower portion 12 comprises the bottom wall 17, the right end wall 18 and a portion 19 of the left end wall of the complete housing. The right hand portion of the bottom wall 17 extends across the full width of the housing, but its left hand end 17a is made narrow for reasons which will subsequently become apparent. This narrow left hand portion 17a of the bottom wall is fluted, as shown in FIGURES 1, 4 and 4a, in the interest of rigidity. These upper and lower housing portions are of metal, accurately formed by punch press operations. The bottom wall of the housing is completed by a plate 20 of an insulating material such as rigid plastic material, this plate 20 being secured to the bottom wall 17 of the lower housing portion 12 as by rivets 21.

In a control device constructed in accordance with the preferred embodiment of the invention it is important that the two housing portions 11 and 12 be accurately positioned with respect to each other as assembled. For this purpose, the upper housing portion 11 is provided at its right hand end with a centrally located ear 11a which is arranged to engage a shoulder 22 formed on the right hand wall 18 of the lower housing portion. The wall 18 extends upwardly, at both edges, beyond the ear 11a and forms a pair of tabs 23 which are arranged to be bent inwardly over the ear 11a to lock the ear downwardly against the shoulder 22. Preferably, the lower edges of the tabs 23 are sloped, as shown in FIG. 2, such that inward bending of the tabs 23 wedges the ear 11a firmly against the shoulder 22.

The side walls 14 and 15 of the upper housing portion 11 include tabs 24 which extend downwardly through notches 25 in the bottom wall 17 of the lower housing portion 12, as clearly illustrated in FIGS. 1 and 2. When these tabs 24 are bent over they hold the lower edges of the walls 14 and 15 firmly against the upper surface of the plate 20, as shown in FIGS. 4 and 4a. By these means the upper and lower housing portions 11 and 12 are firmly held together in fixed and predetermined relationship. In particular, the relative positioning of the two housing portions along the vertical, as the device is viewed in FIG. 2, is fixed and predetermined, for the various tabs and ears which secure and position the respective housing components are accurately sized and positioned by reason of the punch press method of manufacture.

Secured to and extending through the plate 20 is a pair of fixed contacts 26, as seen best in FIGS. 1, 5 and 5a. Each of the contacts 26 is electrically connected to a terminal 27 in the manner shown in FIGS. 5 and 5a, each terminal 27 being secured to the plate 20 as by a rivet 28. As is clearly shown in FIG. 1, the narrowing of the metal bottom wall 17 at 17a and the use of the insulating plate 20 to complete the bottom wall of the housing provide for convenient and economical mounting of the contacts 26 and the terminals 27 without the necessity of employing grommets, shims or fastening devices of insulating material.

A pair of movable contacts 31 is arranged for cooperation with the stationary contacts 26. Each movable contact 31 is secured to and carried by a spring terminal 32, best seen in FIG. 7. The movable contact 31 is secured to the spring terminal 32 near the free end thereof, the other end of the spring terminal being held against the upper surface of the plate 20 by a rivet 33 (see FIG. 2), and terminating in a terminal portion 34 extending down through a slot 35 in the plate 20. Preferably the terminal portion 34 is fluted, as at 34a, FIG. 1, such that the lug is held firmly in place within the slot 35. Further, the terminal portion has a flange 34b, which locks beneath the plate 20. It is intended that the spring terminals 32 bias the movable contacts 31 against the fixed contacts 26 with sufficient force that good electrical contact is thereby obtained between the cooperating contacts.

As seen best in FIGS. 5 and 7, the free end of each spring terminal 32 is turned upwardly and has an opening 36 therethrough for receiving a switch actuating member 40.

The switch actuating member 40 comprises a flat metal spring blade 41, and a fork 42 of rigid insulating material such as vulcanized fiber or a suitable plastic, these two parts being secured together as by rivets 43. At the right hand end of the spring blade 41 is a tab 44 which is arranged to extend into an opening or slot 45 in the end wall 18 provided for that purpose. The slot 45 is of such width as to receive the tab 44 freely while maintaining the tab and, hence, the right hand end of the switch actuating member substantially centered within the housing. Rightward movement of the switch actuating member 40 with respect to the housing is limited by engagement of shoulders 46 at both sides of the tab 44 with the end wall 18.

The left hand end of the spring blade 41 extends into the recess in the fork 42 and is preferably formed to a knife edge 47. A U-shaped spring 50 is compressed between the knife edge 47 and an adjusting screw 51 which threadedly engages the portion 19 of the left hand end wall formed by the lower housing portion 12. As is shown in FIG. 2, the lower tips of the U-shaped spring 50 are grooved and dimpled for receiving, respectively, the knife edge 47 and the tip of the adjusting screw 51. A lock nut 52 is provided for locking the screw 51 in adjusted position.

It will be understood that adjustment of the screw 51 such that it extends farther into the housing causes further compression of the U-shaped spring 50, whereby the latter exerts a greater force against the knife edge 47 of the switch actuating member 40. Accordingly, a greater vertical force is required to cause the knife edge 47 to snap over center of the force exerted thereagainst by the U-shaped spring 50. This results in a greater amplitude or temperature difference between switch opening temperature and switch closing temperature for example.

The tips 42a of the fork 42 are arranged within the openings 36 in the spring terminals 32 which carry the movable contacts 31. These parts are so proportioned that when the switch actuating member 40 is in its normal or lower position the tips 42a lie below the edges of the spring terminals 32 which define the upper sides of the openings 36, all as clearly shown in FIG. 5. The tips of the fork 42 also extend into a slot or slots 54 in the left wall portion 19 whereby upward movement of the fork 42 is limited.

The bottom wall 17 of the lower housing portion 12 is embossed or dimpled, as at 55, to form a shoulder 55a extending transversely of the spring blade 41 and in parallelism therewith, to provide a fulcrum about which the blade 41 will flex, as later explained.

An expansible member 60 is mounted on the upper housing portion 11 for cooperation with the switch contacts by way of the switch actuating member 40. The expansible member 60 includes nested cup portions 60a and 60b having cylindrical wall portions which are brazed or otherwise secured together in pressure-tight relationship. The expansion member 60 is provided with a spud 61, the upper end of which comprises a reduced diameter neck which extends through an opening in the bail of a U-shaped spring 62, and is peened over the spring, all as clearly shown in FIG. 3. The spud 61, and hence the entire expansible member 60, is thereby secured to and may be supported by the spring 62. As seen best in FIGS. 2 and 3, the lower edges of the U-shaped spring 62 engage the side walls 14 and 15 of the upper housing portion 11, the lower edges of the spring 62 being slotted as at 63 to receive embossments 64 extending inwardly from the walls 14 and 15. The expansible member 60 is thereby held resiliently upwardly with respect to the upper housing portion 11 by the U-shaped spring 62.

An adjusting shaft 65 is threadedly received within an opening in the upper wall 13 of the upper housing portion 11 and is thereby maintained in alignment with the spud 61 of the expansible member 60. Desirably, a shouldered extension 65a, of reduced diameter, enters a coaxial cavity in spud 61, as shown in FIG. 3. It will be seen that rotation of the shaft 65 in one direction will force the entire expansible member 60 downwardly toward the switch actuating member 40 against the action of the spring 62. Rotation of the shaft 65 in the other direction permits upward movement of the expansible member 60 by the spring 62. It should be noted that the spring 62 takes up the play in the threaded connection between the shaft 65 and the housing wall 13.

An L-shaped member 66 threadedly engages the shaft 65 and may be locked in adjusted position with respect thereto by a lock nut 67, which also threadedly engages the shaft 65. Preferably, a suitable knob 68, shown in phantom lines in FIG. 2, is provided for convenient manipulation of the adjusting shaft 65. Such control knob 68 is preferably slotted to receive the L-shaped member 66. A tab 69 is preferably punched upwardly from the housing wall 13 to engage a tab 66a on the L-shaped member 66 whereby rotation of the temperature adjusting shaft 65 is limited to slightly less than 360°.

On the lower surface of the expansible element 60 is a centrally located button 60c for engagement with the spring blade 41, and more specifically, a pimple 41a formed on said blade in coaxial relation with said button. Provision of the pimple 41a assures application of force to the switch actuating member 40 by the expansible member 60 at a given point along the length thereof. The interior of the expansible member 60 is in communication with a tube 70 which enters the housing through an opening in the end wall 16 of the upper housing portion 11 and connects to the spud 61 of the expansible member 60 in branching relation to the central passage 61a of said spud. The tube 70 is held against the side wall 14 of the upper housing portion 11 by a three-armed clip 71 which is in turn held to that wall by a screw 72.

As is well known in the art, the element 60 is designed for expansion or contraction in accordance with the direction and extent of change of a selected physical state of an external body (not shown). For example, if the device is to control the temperature of the body, the tube 70 would be part of a temperature responsive system in which a bulb "B" is provided at the free end of tube 70, and the system would be charged with a gaseous or liquid medium which would expand or contract (or generate more or less vapor pressure) as the bulb sensed the temperature change of the body. If the control device is to operate the contacts 20 and 31 in response to pressure change, the tube system may be in open communication with a pressure vessel or the like, or, alternatively, the bulb "B" at its free end may in this case comprise an expansion member (not shown) which will respond to the pressure differential.

The structure incorporated in the illustrated embodiment of the invention now having been described in detail, a typical operation thereof is described below in the interest of a fuller understanding of the invention. It will be assumed that switch contact operation is to respond to the temperature change of an external body.

With the device fully assembled and with the shaft 65 or the knob 68 set at a desired temperature, let it be assumed that the temperature of an oven, for example, is below the temperature for which the control device has been set by appropriate rotation of knob 68. The entire control device will then be in the condition illustrated in FIGS. 2, 4 and 5. More specifically, the expansible element 60 will be in a state of collapse, whereupon the switch actuating member 40 will be in its downwardly concave condition and the movable switch contacts 31 will be in engagement with the corresponding fixed contacts 26. The tips 42a of the fork 42 may or may not be in actual engagement with the contacts 31, depending upon the axial adjustment of the element 60 relative to the blade 41, for it will be remembered that the blades 32 bias the contacts into closed circuit relationship. Circuit continuity is, therefore, provided between the terminals 34 and the corresponding terminals 27, it being understood that the contacts are arranged in a double-pole, single throw, circuit relationship. Where the device is employed to control heating circuits involving not more than 5000 watts, these circuits may be controlled directly by the switches incorporated within the device. Where heavier heating currents are being controlled, the switches incorporated within the device are preferably employed to operate relays or the like (not shown) which in turn control the heating circuit.

As the temperature of the oven rises, fluid is driven through the tube 70 into the expansible member 60 in a well known manner and causes the member 60 to expand vertically. Since the upper end of the spud 61 is engaged by the lower end of the shaft 65, the button 60c is moved downwardly to engage the pimple 41a of the spring blade 41. Continued downward movement of the button 60a bends the spring blade downwardly between the fulcrum 55 and the edge of the right hand wall 18 which defines the lower side of the slot 45. This, of course, results in an upward movement of the free end of the blade 41. When the spring blade 41 has thus been flexed sufficiently, the left hand end of the switch actuating member 40 snaps upwardly, passing over center of the force applied against the knife edge 47 by the U-shaped spring 50.

By reference to FIG. 5 it will be seen that the fork 42 of the switch actuating member 40 exerts no lifting force against the spring terminals 32 until it snaps through the over-center axis established by the U-spring 50. Accordingly, the movable contacts 31 are held firmly against the fixed contacts 26 by the full spring force of the terminals 32 until the fork ends 42a snap upwardly against the upper boundary of the associated openings 36 and snatch the movable contacts 31 to their full open positions. This feature of the invention minimizes arcing and burning of the contacts, particularly as compared to a control device wherein switch contact pressure is reduced substantially to zero value prior to opening of the contacts.

Upward movement of the fork 42 is limited by the engagement of the ends 42a thereof with the edge of the left wall 19 which defines the upper side of the slot 54. This prevents excessive bending of the spring terminals 32 which might otherwise distort these terminals and adversely affect contact pressure.

The opening of the switch contacts interrupts the heating circuit, whereupon the temperature of the oven drops. The element 60 contracts, retracting the button 60c relative to the blade 41, and the blade moves toward its original upwardly bowed condition. The knife edge 47 of the spring blade 41 thereby exerts an increasing downward force against the right hand leg of the U-shaped spring 50. When this force reaches a critical value, the knife edge 47 moves rapidly downwardly, snapping over center of the force exerted thereagainst by the U-shaped spring 50 and restoring to its first position. The fork 42 disengages from the spring terminals 32, which return the associated movable contacts 31 to the closed circuit relationship with the fixed contacts 26.

The marked advantages of the control device illustrated in the drawings and described above are attributable to numerous features of the device, considered both individually and in combination. Regarding the amplitude adjustment, for example, it will be readily apparent that a very small change in the position of the screw 51 will result in a substantial change in the spread between the temperatures at which the contacts open and close. Extraneous effects on this adjustment are held to a minimum in the above described embodiment of the invention by virtue of the fact that the U-shaped spring 50 and the switch actuating member 40 are compressed between two points on a single unitary housing member, namely the lower housing portion 12. More specifically, the shoulders 46 at the right hand end of the switch actuating member 40 continuously bear against the wall 18 of the lower housing portion 12 because of the longitudinal pressure of the spring against the blade 41, and the left hand leg of the U-shaped spring 50 bears against the range adjusting screw 51 which is mounted in the wall portion 19 of the same lower housing portion 12. Furthermore, these points of contact lie closely adjacent the rigid lower wall 17 of the lower housing portion 12, whereby these points of contact are maintained rigidly in fixed spatial relationship.

Adjustment of the temperature at which the contacts of the control device move from closed to open position involves the positioning of the expansible unit 60, which is mounted on the upper housing portion 11, relative to the switch actuating blade member 41 which is mounted on the lower housing portion 12. The spatial relationship of these cooperating parts, and hence the temperature adjustment of the device, are therefore a function of the relative positions of the upper and lower housing portions as assembled. However, the engaging surfaces of the two housing portions which control the relative positions of the two housing portions, in the manner previously described, are sufficiently stable that the temperature adjustment of the device is maintained well within the limits normally prescribed for a control device of this character. Furthermore, provision is made for initial or factory setting of the temperature adjusting shaft 65 such that compensation may be made for substantial manufacturing tolerances. Such provision includes the adjustability of the L-shaped member 66 on the shaft 65 such that a control knob 68 may be oriented in a properly calibrated angular position.

The U-shaped spring 62 not only provides a convenient, resilient and reliable support for the expansible member 60 but also takes up any play in the threaded connection between the upper housing portion 11 and the temperature adjusting shaft 65. Furthermore, the force supplied to the shaft 65 by the spring 62 is in the same direction as the force applied to the shaft 65 as a result of the button 60a bearing against the switch actuating member 40 when the temperature rises.

The temperature responsive control device described above provides for constant predetermined contact pressure between the fixed and movable contacts up to the instant that the movable contacts are snatched away from the fixed contacts by the switch actuating member, this desirable characteristic of the switch operation being provided for in combination with a snap action switch actuating device which snaps with great rapidity in both directions between full switch open and full switch closed position.

Still further, it may be seen that the two housing portions 11 and 12 may readily be stamped from heavy gauge sheet metal whereby the housing is very economically produced. Not only do the two stamped housing portions provide between them a substantially complete housing, but they also provide a substantial number of supporting points for the working elements of the control device whereby the number of parts is minimized and the assembly of the control device is greatly simplified.

For example, the two housing portions as stamped provide mating surfaces which abut each other when the two housing portions are assembled, and provide integral fastening means for securing the two housing portions together. The lower housing portion 12 in combination with the range adjusting screw 51 provides accurately spaced points for supporting opposite ends of the switch actuating assembly comprising the member 40 and the spring 50. The lower housing member also provides a fulcrum 55 for the switch actuating member 40. It also propides a stop for limiting upward movement of the left hand end of the switch actuating member 40. Still further, it provides convenient means for mounting the fixed and movable switch contacts with a minimum number of parts and assembly steps.

The upper housing portion 13 as stamped provides a stop 69 for limiting rotation of the temperature adjusting shaft 65 and, with a simple tapping operation, provides for the mounting of the temperature adjusting shaft 65. Still further, the upper housing portion 11 as stamped provides for quick, convenient mounting of the spring 62 and the expansible member 60 through the embossments 64.

The two housing portions 11 and 12 illustrated in the drawings form a substantially complete housing for protection of the expansible member and the switch apparatus. Their primary function is, however, to serve as two bases for the two portions of the control elements, and they need not form any substantial part of an enclosure therefor. It will be apparent to those skilled in the art that the expansible member 60, the adjusting screw 65 and associated parts are readily mounted on the base 11, and that the switch apparatus is readily mounted on the base 12. After such mounting of the various operating elements on their respective bases, the two bases are readily joined to complete the assembly of the control device.

While there has been described what is at present considered to be the preferred embodiment of the invention, it will be understood that various modifications may be made therein, and it is intended to cover in the appended claims all such modifications as fall within the scope of the invention.

I claim:

1. In a condition responsive control device, a pair of housing members, means for joining said housing members one to the other in fixed predetermined relationship, an expansible member mounted on one of said housing members, means for effecting expansion or contraction of said member in response to the direction of change in condition of an external body, a fixed switch contact mounted on the other of said housing members, a movable switch contact, a spring member mounted on said other housing member and biasing said movable contact into engagement with said fixed contact, a switch operating lever, and a spring cooperating with said lever for effecting snap action of said lever between two spaced positions, said lever and said spring being mounted on said other housing member, said lever being actuatable by said expansible member to snap between said spaced positions upon expansion of said member, said lever being operatively connected to said movable contact through means on said movable contact spring member providing a lost motion connection such that said lever engages with said spring member to operate said movable contact from engagement with said fixed contact only after said lever has traversed a portion of the distance between said two spaced positions, whereby said movable contact remains in contact with said fixed contact under full bias of said spring member until said lever is in movement from one of said spaced positions to the other.

2. In a temperature responsive control device, a pair of housing members adapted to be joined to each other in fixed predetermined relationship, an expansible member adjustably mounted on one of said housing members, said member expanding or contracting according to the direction and extent of temperature change of an external body, a fixed switch contact mounted on the other of said housing members, a movable switch contact, a spring terminal member electrically connected to said movable switch contact biasing said movable contact into engagement with said fixed contact, and switch operating means including an elongated spring blade and a spring, said spring cooperating with said blade to effect snap action of said blade between two spaced positions, said other housing member having portions for supporting said blade and said spring in pre-stressed condition, said blade being actuatable by said expansible member to snap between said spaced positions under predetermined conditions of expansion of said expansible member, an end of said blade extending through an aperture in said spring terminal member to provide a lost motion connection such that said blade moves said movable contact from engagement with said fixed contact only after said blade has traversed a portion of the distance between said two spaced positions, whereby said movable contact remains in contact with said fixed contact under full bias of said spring member until said blade is in motion from one of said spaced positions to the other.

3. In a temperature responsive control device, a pair of members joined to each other in fixed predetermined relationship to provide a housing, an expansible member adjustably mounted on one of said members within said housing, said member having an axis along which expansion or contraction occurs according to the direction and extent of change in temperature of an external body, a fixed contact mounted on the other of said members, a movable switch contact, a spring member for biasing said movable contact into engagement with said fixed contact, switch operating means including an elongated spring blade and a compression spring substantially aligned therewith, said spring cooperating with said blade to establish an overcenter position traversed by said blade in movement between two spaced positions, said other housing member including a rigid, elongated body portion and a pair of rigid arms projecting therefrom in spaced apart parallel relationship for confining said switch operating means therebetween in pre-stressed condition, means for translating said axial movement of said expansible member into action of said blade to snap between said spaced positions, and means extending from said blade to establish a lost motion connection between said blade and said movable contact, whereby said movable contact remains in contact with said fixed contact under full bias of said spring member until said blade traverses said overcenter position in movement from one of said spaced positions to the other.

4. The combination as specified in claim 3 wherein said other member also includes an embossment projecting from said body portion thereof intermediate said arms and engaging said blade as a fulcrum therefor.

5. The combination as specified in claim 3 wherein one of said arms includes a portion movable toward or away from the other of said arms, whereby the pre-stressing of said switch operating means may be adjusted.

6. In a condition responsive control device, a pair of housing members, means for joining said housing members one to the other in fixed predetermined relationship, an expansible member, said member having an axis along which expansion or contraction occurs according to the direction and extent of departure of a body from a predetermined physical condition, a spring element supporting said expansible member on one of said housing members, adjusting means mounted on said one housing member for axially displacing said expansible member relative to the other of said housing members, a fixed switch contact mounted on the other of said housing members, a movable switch contact, a spring member supporting said movable contact, said spring member being mounted on said other housing member and biasing said movable contact into engagement with said fixed contact, means including said spring member for connecting said movable contact in an electric circuit, switch operating means including an elongated spring blade and a compression spring in articulated relation with one end thereof, said spring cooperating with said blade to effect snap action of said blade between two spaced positions, said other housing member including a rigid, elongated body portion and a pair of end portions projecting therefrom in substantially parallel relationship for confining said switch operating means and said spring therebetween in pre-stressed condition, means engaging between said expansible element and said spring blade to effect movement of said blade end from one to the other said spaced positions upon axial movement of said expansible element, and means carried by said blade and engaging with said movable contact biasing spring to establish a lost motion connection between said blade and said movable contact biasing spring, whereby said movable contact remains in contact with said fixed contact under full bias of said spring member until said blade-carried means is in motion from one of said spaced positions to the other.

7. In a condition responsive control device, a pair of stamped, sheet metal housing members, said members being provided with interlocking portions securing said members in fixed predetermined relationship to provide a complete enclosure, an expansible member adapted to expand or contract along a fixed line of movement according to the direction and extent of departure of a body from a predetermined physical condition, means on one of said members for mounting said expansible member thereon for axial displacement relative thereto, a pair of cooperating switch contacts mounted on the other of said members, and snap-action switch operating means mounted on said other member and actuatable by said expansible member upon expansion or contraction thereof, said other member, as stamped, including a body portion and a pair of rigid arms projecting therefrom in spaced apart relationship for resiliently confining said switch operating means therebetween in pre-stressed condition.

8. The combination as specified in claim 7 wherein said other member as stamped also includes a stamped embossment projecting from said body portion intermediate said arms and engaging said switch operating means as a fulcrum therefor.

9. The combination as specified in claim 7 wherein at least a part of said body portion of said other member is substantially narrower than the enclosure formed by said members, and wherein a sheet of insulating material is secured to said other member and supports said switch contacts.

10. In a temperature responsive control device, a pair of structural members adapted to be joined to each other in fixed predetermined relationship to provide an enclosure, an expansible member comprising a bellows-like structure, a spring element supporting said expansible member on one of said structural members, said expansible member expanding or contracting along a principal axis of movement according to the increase or decrease of pressure therein, adjusting means mounted on said one member for displacing said expansible member along its said axis of movement with respect to said one structural member, a pair of cooperating switch contacts mounted on the other of said structural members, and snap action switch operating means mounted on said other member and actuatable by said expansible member upon axial movement thereof in a predetermined direction, said spring element being U-shaped, the legs of said spring element engaging and being supported by said one structural member, and the bail of said spring element supporting said expansible member.

11. A control device, comprising a housing, a fixed contact therein for connection in an electric circuit, a resilient terminal for connection in said circuit, a contact carried by said resilient terminal and biased thereby into a first electrical circuit condition relative to said fixed contact, contact actuating means within said housing, said actuating means including a flexible blade member pivotally mounted at one end in said housing and having a free end adjacent said resilient terminal, an expansion element disposed within said housing, means effective upon the direction of change in a physical state of a body to cause expansion or contraction of said element along an axis of movement intersecting the plane of said blade member, means for effecting rotation of said blade member about its pivotal mounting upon expansion or contraction of said expansion element, snap spring means interposed between said housing and said blade member free end whereby to establish a snapover position traversed by said blade free end during movement thereon, and means extending from said blade free end into lost motion connection with said resilient terminal for moving said terminal and the control carried thereby from said first to a second electrical circuit relationship, said lost motion connection providing freedom of movement relative to said resilient terminal to operate said movable contact only upon passage of said blade end through its said snapover position.

12. A control device, comprising a housing, a fixed contact therein for connection in an electric circuit, a resilient terminal fixed at one end in said housing for connection in said circuit, a contact carried by said terminal, said terminal being self-biased into rotation establishing a first electrical relationship between the respective contacts, means extending from the free end of said terminal providing wall portions spaced one from the other in the direction of rotation of said terminal, contact actuating means within said housing, said actuating means including a blade member having a free end portion disposed adjacent said resilient terminal, means for effecting movement of said blade member between first and second positions, a compression spring disposed between said housing and said blade member end portion to establish a snapover position traversed by said blade member during the said movement thereof, and an insulated member fixed to said blade free end and having a finger extending between the spaced wall means of said terminal member, the spacing between said wall means providing for free movement of the said finger therebetween until said blade traverses the said snapover position, at which time said finger engages one of said spaced wall means to enforce rotation of said terminal member to move the contact carried thereby to a second electrical relationship with said fixed contact.

13. A control device according to claim 12, in which there are a pair of laterally spaced terminal elements having identical spaced wall means, and the said member fixed to the end of said blade member comprises a forked structure, the fingers of which respectively extend into said operative relation with said spaced wall means; said forked structure serving also to house a portion of said compression spring.

14. A device for operating an electrical switch means between open and closed circuit positions according to the direction of departure of a physical state of a body from a pre-established datum, comprising first and second sheet metal housing members formed to interfit to provide an enclosure, means for insulatedly mounting switch contact means on said first housing member, means for supporting co-operating switch contact means for engagement with or disengagement from said first contact means, a flexible, blade-like, elongated actuator for moving said co-operating contact means into or out of engagement with said first contact means, means for resiliently supporting said contact actuator at spaced locations on said first housing member and in normal operating relationship with said contact means whereby said actuator and the respective contact means may constitute with said housing member a prefabricatable subassembly, condition-responsive means comprising an expansible member adapted to expand or contract along a fixed axis of movement according to the direction of change of said physical state and a U-shaped member for mounting said expansible member, said member having a flexible base to which said expansible member is affixed, means for removably mounting leg portions of said U-shaped member respectively in predetermined positions on opposed walls of said second housing member, axially adjustable means mounted on said second housing member for engagement with said expansible member to effect a desired degree of flexure of the base portion of said U-shaped member, whereby said expansible member, mounting means, and said axially adjustable means may constitute with said second housing structure a prefabricatable subassembly, structure integral with the respective housing members and arranged for mutually interfitting engagement to secure the housing members to each other with the leg portions of said expansible member mounting means in predetermined straddling relation to the contact actuator for engagement of said expansible member with said actuator, and means for translating expansion or contraction of said expansible member into displacement of said contact actuator to effect opening or closing of the respective switch contacts.

15. A device for operating an electrical switch means between open and closed circuit positions according to the direction of departure of a physical state of a body from a pre-established datum comprising first and second sheet metal housing members formed to interfit to provide an enclosure, means for insulatedly mounting switch contact means on said first housing member, means for supporting co-operating switch contact means for engagement with or disengagement from said first contact means, a flexible actuator structure for moving said co-operating contact means into or out of engagement with said first contact means, means for resiliently supporting said actuator structure at spaced locations on said first housing member in normal operating relationship with said contact means whereby said actuator and the respective contact means may constitute with said housing member a prefabricatable subassembly, an expansible member adapted to expand or contract along a fixed axis of movement according to the direction of change of said physical state, a resilient U-shaped member for mounting said expansible member, said member having a base portion, means for mounting said expansible member on said base portion, means for removably mounting said U-shaped member in a predetermined position within said second housing member, axially adjustable means mounted on said second housing member for engagement with said expansible member mounting means to maintain said mounting member and expansible member in position within said second housing member to constitute therewith a prefabricatable subassembly, means on the respective housing members arranged for mutually interfitting engagement to secure the housing members to each other with said expansible member in predetermined relation to the contact actuator for displacement of said actuator in one or another direction by expansion or contraction of said expansible means, and means for causing said contact actuator to effect opening or closing of the respective switch contacts according to the direction of displacement thereof.

16. In a condition-responsive control device having control means arranged to be operated between first and second control positions pursuant to the direction and extent of departure of a physical state of a body relative to a pre-established datum, the combination of structure for establishing a fixed position for mounting said control means, housing means disposed in predetermined fixed position relative to said position-establishing structure, a spring member mounted on said housing means, means for securing a physical-state responsive element to said spring member in actuating relation to said control means whereby response of said element to change in a physical state of said body effects operation of said control means, and means on said housing means for adjustably flexing said spring means for positioning said responsive element in a relationship to said control means establishing the desired datum of reference of said physical state.

17. The device according to claim 16 where said responsive element mounting spring means comprises a U-shaped spring having leg portions fixed within said housing member and a flexible bail portion, said responsive element being affixed to said bail portion by means including a rigid cylindrical member, and the means for adjustably flexing said spring means includes a shaft threadedly mounted in said housing member for engagement with said cylindrical member coaxially therewith.

References Cited in the file of this patent

UNITED STATES PATENTS

| | | |
|---|---|---|
| 2,507,066 | Trautman | May 9, 1950 |
| 2,611,845 | Miller | Sept. 23, 1952 |
| 2,651,692 | Slonneger | Sept. 8, 1953 |
| 2,712,579 | Raney | July 5, 1955 |